United States Patent

Bergum

[15] 3,644,146
[45] Feb. 22, 1972

[54] METHOD FOR CYCLING BATTERY ELECTRODES IN BULK

[72] Inventor: Bernard G. Bergum, Monona, Wis.
[73] Assignee: ESB Incorporated
[22] Filed: Mar. 23, 1970
[21] Appl. No.: 21,850

Related U.S. Application Data

[63] Continuation-in-part of Ser. No. 703,296, Feb. 6, 1968, abandoned.

[52] U.S. Cl. ..................136/76, 136/78, 204/130
[51] Int. Cl. ..................................................H01m 35/30
[58] Field of Search ........136/76, 34, 175, 78; 204/130, 204/140, 213, 96

[56] References Cited

UNITED STATES PATENTS

| | | | |
|---|---|---|---|
| 1,349,549 | 8/1920 | Dietzel | 204/213 |
| 1,734,909 | 11/1929 | Jones | 204/213 |
| 2,390,282 | 12/1945 | Tour et al. | 204/140.5 |
| 3,166,447 | 1/1965 | Bronstert et al. | 136/34 |
| 3,479,271 | 11/1969 | Sandrock | 204/213 |
| 3,507,697 | 4/1970 | Korman | 136/76 |

Primary Examiner—Allen B. Curtis
Assistant Examiner—C. F. Lefevour
Attorney—Alfred J. Snyder, Jr., Robert H. Robinson, Raymond L. Balfour and Anthony J. Rossi

[57] ABSTRACT

Battery electrodes are cycled in bulk in a conductive container by depositing the container in an electrolyte (or alternatively, by depositing the electrolyte in the container) and then passing a current between the container and another conductor present in the electrolyte. The electrodes are then removed from the container and assembled into batteries. Preferably the electrodes are agitated while the current is being passed. Cylindrical rotating containers may be used for the cycling.

12 Claims, 3 Drawing Figures

PATENTED FEB 22 1972　　3,644,146

METHOD FOR CYCLING BATTERY ELECTRODES IN BULK

CROSS-REFERENCE TO RELATED APPLICATION

This a continuation-in-part of application Ser. No. 703,296, filed Feb. 6, 1968 now abandoned.

BACKGROUND OF THE INVENTION

In the battery industry it is desirable to oxidize and/or reduce the active materials in battery electrodes prior to assembling the electrodes into cells, a process frequently referred to as "cycling" or "formation." In past processes each electrode was cycled against another electrode of opposite polarity or against a dummy electrode, and each electrode had to be handled twice and individually electrically connected or disconnected; before cycling each electrode was individually moved into a proper position and connected to a conducting wire, and after cycling the electrode was disconnected from the conducting wire and removed from that position. The past methods thus involved considerable manual effort and were both time consuming and expensive.

SUMMARY OF THE INVENTION

This invention provides a method whereby electrodes may be cycled in bulk without the need to connect, and later disconnect, each electrode to an individual conducting wire. Several thousand electrodes may be cycled at one time by this method. The electrodes may be placed in bulk into a conductive container, with contact between the electrodes and the container or other electrodes replacing the prior conducting wires. The container is placed in a suitable electrolyte and a current passed between the container and another conductor also present in the electrolyte. Alternatively, the electrolyte may be placed in the container and a current passed between the container and another conductor also present in the electrolyte. An example of just one type of equipment which may be used to carry out this process is barrel-plating equipment.

DESCRIPTION OF THE PREFERRED EMBODIMENT

Figure 1:
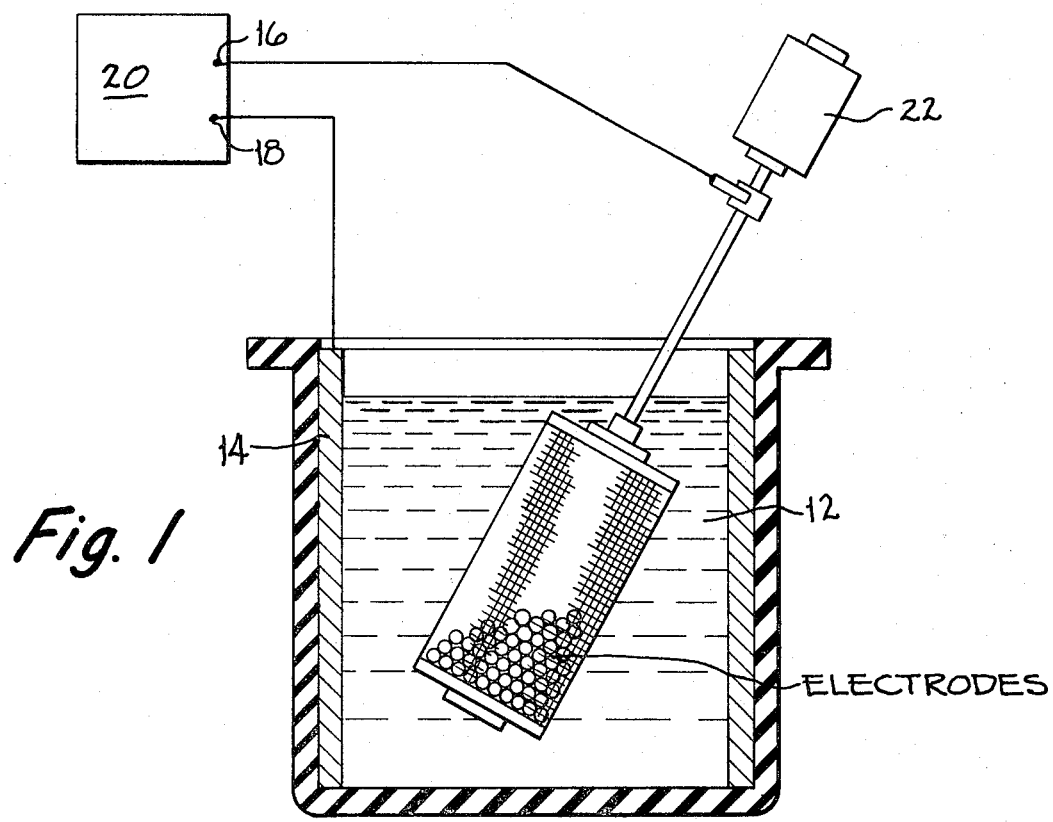
FIG. 1 shows a conductive container immersed in a container of electrolyte. Electrodes of a desired polarity would be placed in the container and cycled against a dummy electrode also immersed in the electrolyte.

In this description the term "cycle" or "cycling" refers to the change in a battery electrode from one state of charge to another. The terms include not only changes from a full state of charge to a full state of discharge, or vice versa, but from a state of partial charge to some other state of charge or discharge.

The active materials within the electrodes of several cell systems must be precycled prior to their assembly in cells to assure proper activity. Typical of these electrodes are those made from nickel or cadmium hydroxides.

With this invention positive and negative electrodes may be cycled simultaneously and against each other by placing them in separate conductive containers, immersing the two containers in a common electrolyte, connecting the containers to the appropriate terminals of an external source of current, and passing a current between the two containers; if electrodes of only one polarity are to be cycled, they may be placed in a conductive container immersed in electrolyte and cycled against a dummy electrode also present in the electrolyte.

As an alternative to placing the conductive container in the electrolyte, the electrolyte may be placed in the conductive container. The other conductor would then be immersed in the electrolyte inside the conductive container, rather than outside the container as shown in the drawing.

Figure 3:
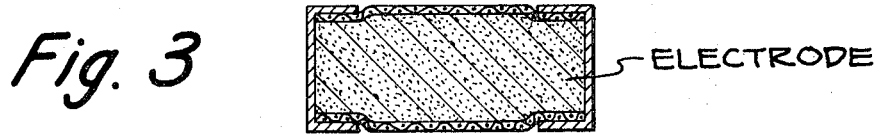
FIG. 3 shows an electrode illustrative of those which may be cycled according to the present invention.

Preferably the electrodes are agitated while the current is being passed in order to achieve a uniform distribution of current among the electrodes in a short time. In such a case it may be necessary to encapsulate each electrode in a protective enclosure to prevent its disintegration due to the agitation. This does not necessarily add any additional work to the process, for in many electrochemical cells the active materials are held in place by retaining screens or other enclosures, and these may be used as the protective enclosures required during agitation. For a cross section of an electrode using such retaining screens, see FIG. 3; and for more detail, see my U.S. Pat. No. 3,216,860, issued Nov. 9, 1965.

The conductive containers may be of any desired configuration. Cylindrical containers may be used advantageously since they may be easily rotated about their axes to provide agitation to the electrodes during cycling. Flat conductive containers in the shape of a rectangular box may also be used, with agitation being transmitted to the containers and their enclosed electrodes by any convenient manner.

To illustrate how the invention might be carried out, several specific examples will now be stated. While the examples are limited to a discussion of the cylindrical conductive containers shown in the two drawings, it should be understood that the invention may be carried out with conductive containers of other shapes.

In FIG. 1 there is shown a conductive container 10 submerged in electrolyte 12. The container contains a large quantity of randomly distributed electrodes which are to be cycled. The container should be made from a material having openings of such size as to permit free flow of electrolyte but retain the electrodes to be cycled; a mesh material is shown in FIG. 1. Electrodes of a desired polarity would be placed in the container 10 and cycled against a dummy electrode 14, the conductive container 10 and dummy electrode 14 being connected to the appropriate terminals 16 and 18 of an external current source 20. The cylindrical container 10 may be rotated about its axis by a motor 22 to agitate the electrodes.

Instead of immersing the single conductive container in electrolyte as is done in FIG. 1, the container may instead be filled with electrolyte, in which case the container walls do not have openings. The dummy electrode is then placed inside the container where it is immersed in electrolyte.

If both positive and negative electrodes are to be cycled simultaneously and against each other, a second conductive container such as the one shown in FIG. 1 may be immersed in the electrolyte as a substitute for the dummy electrode.

Figure 2:
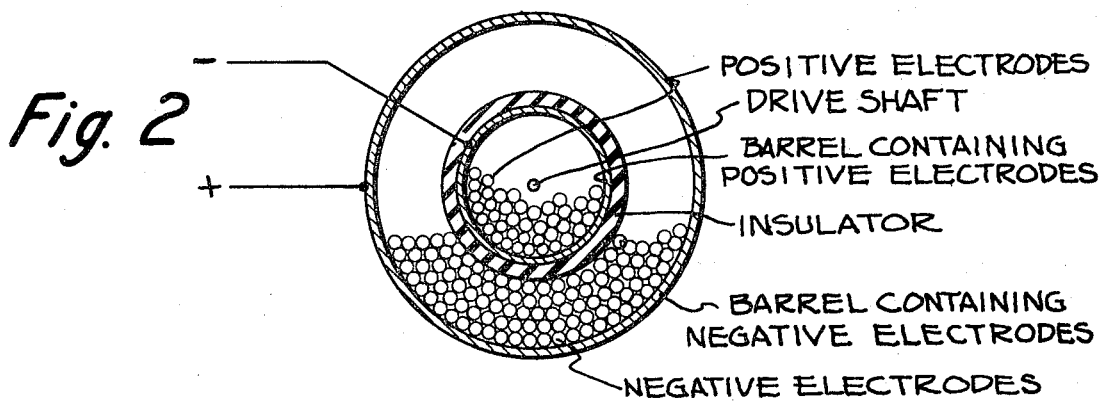
FIG. 2 is an end schematic view showing two concentric cylindrical conductive containers, one for containing positive electrodes and the other for containing electrodes. The containers could be immersed in electrolyte, or electrolyte could be placed inside the larger container.

Another apparatus by which positive and negative electrodes may be cycled simultaneously and against each other is shown schematically in FIG. 2. There the cylindrical conductive containers are concentric. An electrical insulator between the two containers prevents the electrodes in the outer container from coming into electrical contact with the inner container to produce a short circuit. The two containers may be rotated by a single motor. While the inner container must have openings which permit electrolyte to flow between its interior to its exterior, the outer container may either have openings so as to be immersed in electrolyte or may have no openings so as to contain electrolyte. The two containers are connected to appropriate terminals of an external current source.

One reason for preferring cylindrical conductive containers is that they are similar to those used in the barrel-plating art. Such equipment is readily available. Unlike plating processes, nothing is deposited out of solution onto the electrodes with this process, if care is taken in the selection of conductive container materials.

With the equipment used to carry out this process other advantages may also be realized. After the cycling is complete the electrodes may be cleaned and dried by removing the electrolyte and subsequently adding first a cleaning liquid and then a drying liquid or gas. This could be done without removing the electrodes from the container.

One embodiment of the invention may be summarily described as the method comprising the steps of placing electrodes in an electrically conductive container; depositing the container in an electrolyte in which there is another electrical conductor, the electrolyte being in contact with the electrodes; passing an electrical current between the container and the other conductor; removing the electrodes from the conductive container after the current has been passed; and then assembling the electrodes into batteries. A second embodiment differs from the first by placing an electrolyte in the conductive container rather than vice versa as with the first embodiment, there being another conductor in the electrolyte inside the conductive container. A third embodiment consists of placing a pair of electrically conductive containers in a common electrolyte, placing a plurality of electrodes of one polarity in one of the containers, placing a plurality of electrodes of a second polarity in the other container, and then proceeding in a manner similar to that of the first embodiment to pass an electrical current between the two containers after which the electrodes are removed from the containers and assembled into batteries. A fourth embodiment differs from the third by placing an electrolyte in the two containers rather than vice versa as with the third. In all embodiments it is preferred to agitate the electrodes while the current is passing. It is also preferred to use cylindrical conductive containers and to produce the agitation by rotating the containers about their axes.

A number of factors associated with the use of this invention are variables. Both the cycling current density and the time of cycling are variables which depend upon: the properties of the active materials being cycled; the initial and final state of charge of the electrodes; the shape, size, and number of electrodes being cycled; and upon other factors. The particular cycling current density and time to be used, as well as the electrolyte composition, concentration, and temperatures, must of course remain as basic variables to be fixed as required for specific applications.

I claim:

1. A method of cycling battery electrodes comprising the steps of:
    a. placing electrodes of the same polarity in an electrically conductive container, the container having openings therein of such size as to permit entry of electrolyte into the container but to retain the electrodes inside the container;
    b. depositing the container in an electrolyte in which there is another electrical conductor, the electrolyte being in contact with the electrodes;
    c. passing an electrical current through the electrolyte between the container and the other conductor, the container, the electrolyte, and the other conductor being composed of materials which do not deposit out of the electrolyte onto the electrodes when the electrical current is passed;
    d. removing the electrodes from the conductive container after the current has been passed; and,
    e. then assembling the electrodes into batteries.

2. The method of claim 1 in which the electrodes are agitated while the current is passing between the conductive container and the other conductor.

3. The method of claim 2 in which the electrodes are placed in a cylindrical conductive container and the agitation is produced by rotating the cylindrical container about it axis.

4. A method of cycling battery electrodes comprising the steps of:
    a. placing electrodes of the same polarity in an electrically conductive container;
    b. placing an electrolyte in the conductive container, the electrolyte being in contact with the electrodes;
    c. placing another conductor in the electrolyte inside the conductive container;
    d. passing an electrical current through the electrolyte between the container and the other conductor, the container, the electrolyte, and the other conductor being composed of materials which do not deposit out of the electrolyte onto the electrodes when the electrical current is passed;
    e. removing the electrodes from the conductive container after the current has been passed; and,
    f. then assembling the electrodes into batteries.

5. The method of claim 4 in which the electrodes are agitated while the current is passing between the conductive container and the other conductor.

6. The method of claim 5 in which the electrodes are placed in a cylindrical conductive container and the agitation is produced by rotating the cylindrical container about its axis.

7. The method of cycling battery electrodes comprising the steps of:
    a. placing a plurality of electrodes of one polarity in a first electrically conductive container, the first container having openings therein of such size as to permit entry of electrolyte into the first container but to retain the electrodes inside the first container;
    b. placing a plurality of electrodes of a second polarity in a second electrically conductive container, the second container having openings therein of such size as to permit entry of electrolyte into the second container but to retain the electrodes inside the second container;
    c. depositing both containers in a common electrolyte, the electrolyte being in contact with both pluralities of electrodes;
    d. passing an electrical current through the electrolyte between the two containers, both containers and the electrolyte being composed of materials which do not deposit out of the electrolyte onto the electrodes when the electrical current is passed;
    e. removing the electrodes from the two containers after the current has been passed; and,
    f. then assembling the electrodes into batteries.

8. The method of claim 7 in which the electrodes in both containers are agitated while the current is passing between the two containers.

9. The method of claim 8 in which the two pluralities are placed in concentric cylindrical containers and the agitation is produced by rotating the cylindrical containers about their axes.

10. The method of cycling battery electrodes comprising the steps of:
    a. placing a plurality of electrodes on one polarity in a first electrically conductive container;
    b. placing a plurality of electrodes of a second polarity in a second electrically conductive container, the second container being inside the first container, the second container having openings therein of such size as to permit the entry of electrolyte into the second container but to retain the electrodes inside the second container;
    c. placing an electrolyte in the two containers, the electrolyte being in contact with both pluralities of electrodes;
    d. passing an electrical current through the electrolyte between the two containers, both containers and the electrolyte being composed of materials which do not deposit out of the electrolyte onto the electrodes when the electrical current is passed;
    e. removing the electrodes from the two containers after the current has been passed; and,
    f. then assembling the electrodes into batteries.

11. The method of claim 10 in which the electrodes in both containers are agitated while the current is passing between the two containers.

12. The method of claim 11 in which the two pluralities are placed in concentric cylindrical containers and the agitation is produced by rotating the cylindrical containers about their axes.

* * * * *